United States Patent [19]
Burgert

[11] 4,153,814
[45] May 8, 1979

[54] TRANSITION CODING METHOD FOR SYNCHRONOUS BINARY INFORMATION AND ENCODER AND DECODER EMPLOYING THE METHOD

[75] Inventor: Albert Burgert, Arcueil, France

[73] Assignee: Societe Anonyme dite Compagnie Industrielle des Telecommunications Cit-Alcatel, Paris, France

[21] Appl. No.: 818,998

[22] Filed: Jul. 26, 1977

[30] Foreign Application Priority Data

Aug. 4, 1976 [FR] France ............................. 76 23809

[51] Int. Cl.² ........................................... H04L 27/00
[52] U.S. Cl. .......................................... 178/68; 325/30
[58] Field of Search ....................... 325/13, 38 A, 30; 178/68, 70 R, 70 TS; 328/162, 164; 340/347 DD; 179/16 E, 16 EA

[56] References Cited

U.S. PATENT DOCUMENTS 3,986,053   10/1976   Döemer ............................. 328/164
4,003,041   1/1977    van Duuren et al. ........ 340/347 DD

*Primary Examiner*—Benedict V. Safourek
*Attorney, Agent, or Firm*—Roland Plottel

[57] ABSTRACT

This invention relates to a method of encoding data by transitions in a binary sequence, as well as to a coder and a decoder using the method. In the method data is encoded as follows: a first value bit is encoded by a transition in the middle of the corresponding bit-time, but this transition is inhibited if there was a transition in the middle of the previous bit-time, a second value bit is encoded by a transition at the beginning of the corresponding bit-time, but this transition is shifted from the beginning to the middle of the bit-time if there was a transition in the middle of the previous bit-time.

11 Claims, 7 Drawing Figures

TRANSITION CODING METHOD FOR SYNCHRONOUS BINARY INFORMATION AND ENCODER AND DECODER EMPLOYING THE METHOD

The invention pertains to the digital electrical signal processing field and encompasses a binary transition coding process operating on synchronous binary data signals clocked at a frequency F, a coding device for its implementation, and an associated decoding device. It is applicable, in particular, to the transmission of intelligence in aerospace communications or telephony.

The coding of binary input information by means of a two-level signal is a known art. In one type of coding, the level of the signal conveys the intelligence, and in another, it is the transitions from the one to the other level which are significant. In both cases, coding is synchronised by a clock signal defining a time for each bit that is equal to one period of the input information.

In non-return-to-zero (NRZ) level coding, each binary 1 is represented in the coded signal by a first level, which is held constant during its bit time, and each binary 0 is represented in the coded signal by a second level, also held constant during its bit time.

Such a code is very simple, but has certain disadvantages in transmission. In particular, deriving the timing information from the coded signal, necessary at reception for decoding, involves complicated equipment, and further, as the energy of the coded signal is not nil at the lower end of the frequency spectrum, and depends on the sequence of bits coded, the D.C. component has to be transmitted.

It is known that the above disadvantages are avoided by using a two-state differential code, which is a transition code, and in which each bit of a first value is represented, in the coded signal, by a transition at the center of its bit time, and each bit of a second value, by the absence of a transition at the center of its bit time, a transition being moreover introduced at the beginning of each bit time for easy recovery of the timing information from the coded signal.

In a signal in two-state differential code, the minimum time interval between two successive transitions is thus equal to half the period of the synchronous binary input's clock signal.

The invention offers a new process for the transition coding of synchronous binary data, which while avoiding the disadvantages of NRZ codes results in a coded signal in which the minimum time interval between two successive transitions is greater than half the period of the synchronous binary input's clock signal. This reduces the transmission band required, as compared with the bandwidth demanded for two-state differential coding.

The present invention provides a method of coding synchronous binary data timed by a frequency F, in which said data are coded by level transitions produced in an electrical signal exhibiting two levels under the control of a clock signal defining a bit-time of duration 1F for each binary digit, wherein the method comprises producing a transition in said two-level signal in the middle of each bit-time occupied by a bit of a first given value, and inhibiting such transitions in the two-level signal if said signal has changed level in the middle of the preceeding bit-time; producing a transition in the two-level signal at the start of each bit-time occupied by a bit of second given value; and shifting said transition to the middle of that bit-time, if the two-level signal has changed level in the middle of the previous bit, and maintaining the level of said two-level signal constant during the remainder of the time.

The present invention also provides a first means receiving the said binary data and the clock signal H to provide a first two-level signal having a level transition in the middle of each bit-time for which the data has the first said given value, second means receiving the said data and the clock signal H and providing a second two-level signal having a level transition at the beginning of each bit-time for which the data has the second said given value, third means receiving the said first signal to provide a third two-level signal which changes level at each transition of a first level to a second level of the said first signal, fourth means receiving the said second signal and controlled by the said first means to provide a fourth two-level signal which changes level at each transition of the second signal which occurs while the said first signal is at the said first level and also one half period $\frac{1}{2}.F$ after each transition of the second signal which occurs when the first signal is at the said second level, and fifth means receiving the said third and the said fourth signals to provide a two-level signal having a level transition at each transition at each of the said third and fourth signals.

In a particular embodiment of the invention, the said clock signal H has a form factor $\frac{1}{2}$, the said fourth means comprises means for phase modulating the clock signal H with the first signal, and a sampling and blocking flip-flop sampling the said second signal under the control of the modulated clock signal and delivering the said fourth signal.

The invention further provides a device for the decoding of the signal resulting from encoding according to the process of synchronous binary information timed at frequency F, and comprising a transition detector for detection of the transitions in the signal to be decoded, a local clock comprising a voltage driven oscillator, said clock delivering a signal Hr at frequency F and composed of alternating pulses of a first and second level, each of $\frac{1}{2}.F$ duration; A first means connected to said detector and receiving said signal Hr to deliver a pulse 1 of $\frac{1}{2}.F$ duration following each transition in the signal for decoding which has occured when signal Hr was at a given level of the two said levels; a second means for phase modulation of said signal Hr by means of signal S, the latter consisting of a string of pulses I, the modulated signal delivered by said second means being filtered by a low-pass filter before application in control of said oscillator, so that said given levels of signal Hr will be centered on transitions situated at the center of bit-times in the signal to be decoded; a sampling-rejecting circuit receiving signal S and controlled by the edges of the Hr signal going from said stated level to the other level; a third means clocked by Hr to detect the transitions in the output singal of said sampling-rejecting circuit and to deliver a bit of said first or said second value, at each period of signal Hr, according to whether the output of said sampling-rejecting circuit has or does not have a transition at the start of said period of signal Hr.

In a particular embodiment of the decoding device, said transition detector delivering a short pulse, called a "transition pulse" in response to detection of a transition in the received coded message, said first means includes a gate for selection of those transition pulses, amongst all the others, which appear while Hr is at said given level, plus a single-shot flip-flop to extend the duration of the transition pulses so detected to $\frac{1}{2}.F$.

Other features and advantages of the invention will become apparent in the course of the following description, made with reference to the accompanying drawings in which:

FIG. 1 illustrates encoding, according to the invented process, of synchronous binary information clocked at frequency F. For example, we shall assume that these data are supplied in the form of a NRZ code, as shown in a).

The bit-times of duration 1/F occupied by the bits of the NRZ signal are shown along the top of this diagram with the binary value of each bit. Line b) represents the bit-times m, also of duration 1/F allocated to the input bits in coding according to the invention. In the particular embodiment of the invention represented here, said bit-times m coincide with those of the NRZ signal.

The coded output signal is represented by line (c).

Figure 1:
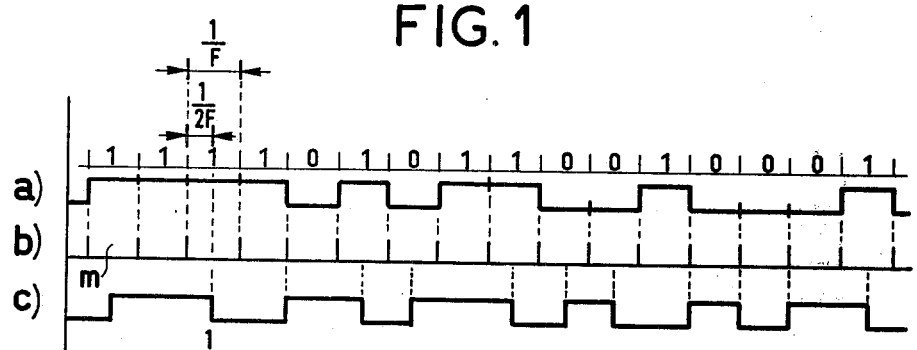
FIGS. 1 and 2, illustrate the coding process embodying the invention.

The particular example of the method of the invention illustrated by FIG. 1 is as follows: in the two-level coded signal:

a binary 1 is represented by a level change corresponding with the middle of its bit-time; but the change is inhibited if a change has occurred at the center of the previous bit-time;

a binary 0 is represented by a level change corresponding with the beginning of its bit-time, but this change is shifted to the middle of the bit-time, if a change occurred at the center of the previous bit-time.

the coded signal's level remains unchanged during the rest of the time.

It is readily seen from FIG. 1, that the minimum time interval separating any two successive level changes in the coded signal is equal to the duration of one period of the input data clock, and that the maximum such interval is equal to the duration of two such periods. It may be noted, further, that a series of binary 0's produces a component at frequency F/2, and that a series of 1's produces a component of frequency F/4.

Figure 2:
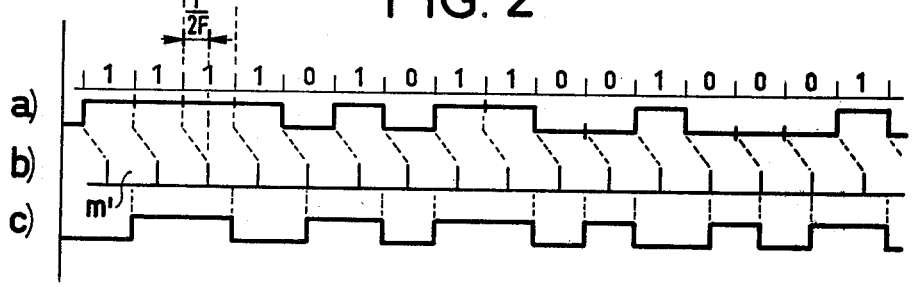

It is evidently possible, with this invention to interchange the coding modes for binary 1's and 0's. Further, it is not essential for bit-times m defined for coding according to the invention, to coincide with those of the NRZ signal: FIG. 2 illustrates a case, in which there is a phase difference between the two series of bit-times.

Line (a) in FIG. 2 is line (a) of FIG. 1, and line (b) in FIG. 2 illustrates a series of bit-times delayed by $\frac{1}{2}.F_2$ in respect of those of the NRZ signal. Line (c) in FIG. 2 represents the coded signal produced according to the invented process as described earlier, but using the m' series of bit-times, instead of the m series.

The coded signal therefore lags the coded signal shown in (c) of FIG. 1 by $\frac{1}{2}.F$.

The phase difference between the series of bit-times defined for coding according to the invention, and those of the NRZ signal, could be of quite another value.

Figure 3:
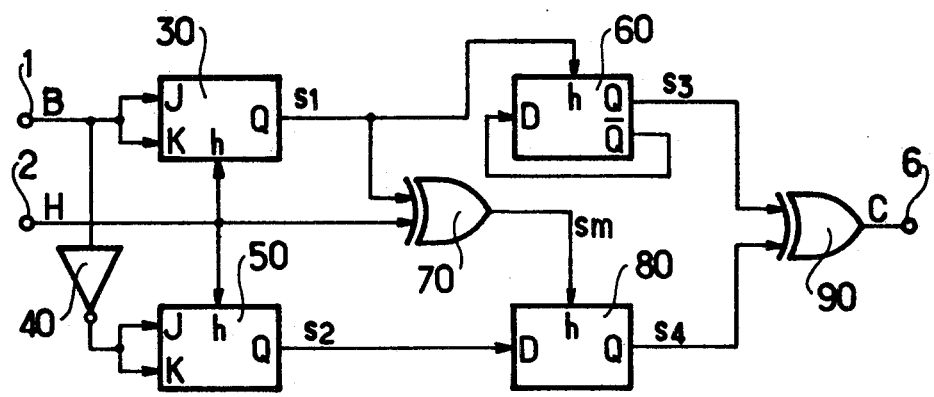
FIG. 3, represents a first embodiment of the encoding device according to the invention.

FIG. 3 represents a particular form of the coding device according to the invention for the encoding of binary information B clocked at rate F, into a coded signal C.

The binary information B, assumed to be in the form of an NRZ signal timed by clock signal H' at rate F, is applied at a first input 1 of the device, which has a second input 2 for a sync. signal H. Signal H is a clock signal at rate F in a given phase relationship with H', with, moreover, a form factor of $\frac{1}{2}$ and consequently composed of alternating square wave pulses forming a high and a low level, each lasting $\frac{1}{2}.F$. Signal H defines a bit-time m of 1/F for each bit to be encoded, and which starts on an edge of a determined direction of change, such as rising, of this signal H.

Input 1 to the system is connected to the J and K wires of a first JK flip-flop 30, clocked by signal H at input h, and delivering a signal s at its Q output. The input 1 is also connected via an invertor 40 to the J and K inputs of a second JK flip-flop 50 which is clocked by the signal H at its clock input h and which delivers a signal s2 at its Q output. The signal s1 delivered by the flip-flop 30 is applied to the clock input h of a first D type flip-flop 60 whose inverted Q output is looped back to its D input and which delivers a signal s3 on its Q output. The signal s1 is also applied to a first input of a first EXCLUSIVE OR gate 70 which receives the clock signal H on a second input. The gate 70 thus phase modulates the clock signal H with the signal s1, and delivers a signal sm which is applied to the clock input h of a second D type flip-flop 80 which receives on its D input the signal s2 delivered by the flip-flop 50. The signal s4 delivered by the Q output of the flip-flop 80 is applied to a first input of an EXCLUSIVE OR gate 90 which receives the signal s3 delivered by the flip-flop 60 on its second input. The output of the EXCLUSIVE OR gate 90 is connected to the output 6 of the device and delivers the coded signal C.

Figure 4:
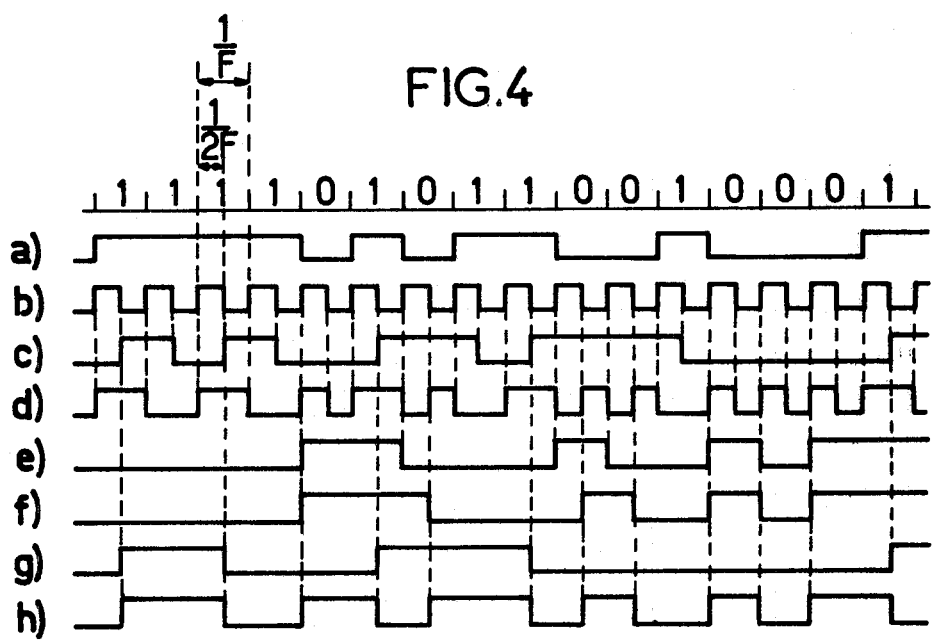
FIG. 4, illustrates operation of the encoding device represented in FIG. 3.

The following is a description of the coding device's operation as shown in FIG. 3, and with reference to FIG. 4.

A particular configuration of signal B is respresented by (a) in FIG. 4: it is the one represented by (a) in FIG. 1, and as in the latter figure, the bit-times and bit values of B are shown directly above the wave-form. Line (b) represents clock signal H, of which the pulse periods (full wave) define bit-times m. In the example taken for FIG. 4, the series of bit-times m and of signal B coincide (in practice the clock signals H and H' do not coincide exactly; preferably H lags H' very slightly thereby avoiding chance operations in the circuit of FIG. 3). The signals s1 and s2 are shown at (c) and (d) and the signals s2, s4 and s3 are shown at (e) (f) and (g) and the code signal C is shown at (h).

In accordance with the well known operation of a master-slave JK flip-flop, each rising edge of signal H coinciding with a binary 1 in signal B switches the level of signal s1 on the following falling edge of the clock signal H whereas each rising edge of H coinciding with a binary 0 in signal B leaves the level of s1 unchanged. As shown by (c) in FIG. 4, the level of s1 changes in the middle of each bit-time occupied by a binary 1 in the signal to be encoded.

Signal sm represents a phase-shift of 180° in signal H each time the level of sl changes, that is to say, the inhibition of level transition in signal H in the middle of any bit-time of the binary information to be encoded, that is encoded by a 1.

As can be seen in line (d) of FIG. 4, signal sm has a level transition at the beginning of each bit-time, whether occupied by a 1 or a 0, plus a transition in the middle of each bit-time containing a 0.

The JK flip-flop 50 is not of the master slave type and it changes state on the rising edges of the signal H. Each rising edge of the signal H for which the signal B is at "1" ($\bar{B}$ at "0") causes a change in the level of the signal s2 and each falling edge of the signal H for which the signal B is at "0" ($\bar{B}$ at "1") leaving the signal s2 unchanged. Thus as shown in the wave form diagram (e), the signal s2 thus comprises a transition at the beginning of each bit time for which the data to be coded is 0.

The D type flip-flop 80 is a simple sample and block flip-flop: on each rising front of the signal sm applied to its clock input the output signal s4 takes the value of the signal s2 applied on its D input. When the signal sm is in phase with the signal H, i.e. when the signal s1 is at "0", the flip-flop 80 samples the signal s2 at the beginning of the bit time and the signal s4 is an instantaneous copy of the signal s2 (in order to avoid any uncertainty in operation, two inverters may be inserted in series between the output of the gate 70 and the clock input of the flip-flop 80 to delay the signal sM slightly). When the signal sm is in phase opposition with the signal H, i.e. when the signal s1 is at "1", the flip-flop 80 samples the signal s2 in the middle of the bit-times and in this case the signal s4 has a delay of $\frac{1}{2}$.F with respect to the signal s2. The signal s4 thus includes a transition at the beginning of each bit-time for which the data is "0" and the signal s1 is "0" and it has a transition in the middle of each bit-time for which the data is "0" and signal s1 is "1".

Owing to the feedback connection of flip-flop 60, its outputs change at each rising edge of signal s1, which makes the flip-flop 60 a frequency divider; so that signal s3 collected at its Q output reflects the rejection of every second transition of signal s1. The signal s3 thus has a transition in the middle of every other bit time for which the data is a "1".

Since the transitions of the signals s3 and s4 occur at different instants, the EXCLUSIVE OR gate 90 can "add" these transitions, i.e. the coded signal C which it provides has a transition for each transition of each of the signals s3 and s4. Consequently, and as shown by line (h), signal C has:

- a transition at the middle of each "1" bit-time immediately following a bit-time in which the level of C remained unchanged;
- a transition at the start of each "0" bit-time immediately following a bit-time in which the level of C remained unchanged;
- a transition at the middle of each "0" bit-time immediately following a bit-time, at the middle of which the C level changed.

The level of signal C remains unchanged at all other times.

Figure 5:
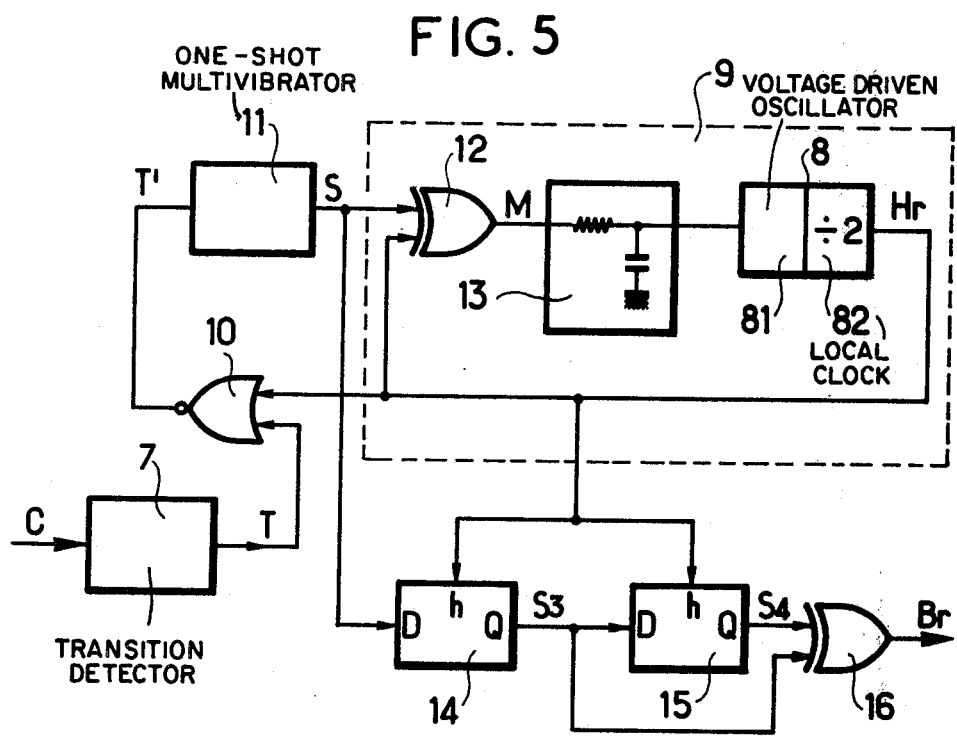
FIG. 5, represents a second embodiment decoding device according to the invention.

As already stated, the invention is applicable, in particular, to the transmission of information. In the event of radio transmission, the encoder is connected at the end of the line of transmission equipment, just ahead of the modulator, in which the coded signal modulates a RF carrier. At the receiving terminal, the incoming signal is demodulated to derive the coded signal and restore it to the low frequency band. It is then decoded, to derive the initially encoded binary information. It is thus a question of reconstituting the binary information from the coded signal. FIG. 5 represents a device for the decoding of the signal encoded according to the invention, for example by means of a device as represented in FIG. 3.

For simplicity, we shall continue to use the coded signal, binary information, clocking frequency and coding control signals, references C, B, F, and H respectively, as formerly.

In FIG. 5, signal C is fed to a transition detector 7, of known type, which delivers a short output pulse T, termed "transition pulse", in response to each transition.

Pulses T are, for example, negative.

Local clock 8, comprising a voltage-driven oscillator 81, followed by scale-of-two frequency divider 82, is included in phase-locking loop 9 controlled by signal S developed from transition pulses T in a manner to which we shall revert. Local clock 8 delivers a signal Hr of form-factor $\frac{1}{2}$, and which, when the loop has locked, is of the same frequency F as clock signal H, but leading H by a quarter of a period of H.

For the development of signal S, clock signal Hr, which is in the form of alternating high and low levels, of duration $\frac{1}{2}$.F, is fed to a first input of NOR gate 10, transition pulses T being connected to the second input of that gate. Gate 10 passes and inverts the transition pulses occuring during low levels of signal Hr, rejecting those occuring during high levels. As Hr leads H by a quarter of the latter's period, gate 10 inverts the pulses T which represent transitions in the middle of bit times, and rejects those representing transitions at the start of bit times. The very short pulses T' delivered by gate 10 are fed to one-shot multivibrator 11 for expansion of their durations to $\frac{1}{2}$.F. Circuit 11 therefore delivers a string of positive pulses I of $\frac{1}{2}$.F duration and appearing in step with the transitions of signal C occuring during the low levels of Hr, that is to say, with the central transitions of signal C.

Pulses I constitute signal S, which controls loop 9.

Phase-locking loop 9 comprises, in addition to local clock 8, an exclusive OR gate 12 receiving signal S at one input and signal Hr at the other, for phase modulation of signal Hr with signal S. The modulated signal M delivered by gate 12 is fed through low pass 13 to drive oscillator 81, which responds by generating a signal at frequency 2.F, which after frequency division by two, is shaped by divider 82, and constitutes signal Hr. Further on, and with reference to FIG. 7, we shall return to operation of this loop.

The decoding device shown has a first type D flip-flop 14 receiving signal S at D and clocked at h by Hr. Flip-flop 14 delivers signal S3, which is applied to wire D by a second type D flip-flop 15, also clocked by Hr at h. Consequently, flip-flop 15 delivers a signal S4, which repeats S3 with a delay equal to one period 1/F of signal Hr. Signal S4 is fed to one input of exclusive OR gate 16, which receives S3 at its over input. Gate 16 delivers signal Br, which, as we shall show, reproduces the binary input B.

In accordance with the foregoing description, the presence of a transition at the center of a bit-time in signal C results in a pulse I in signal S extending over the second half of the bit time. As clock Hr leads H by a quarter of a period (H defines the bit time), each pulse I therefore extends between the last quarter of one period of signal Hr, and the first quarter of the next-following period. Sampling signal S at the start of each period of signal Hr therefore produces a "1" level in signal S3, if there is a central transition, and a "0" level in the contrary case.

As a result, if there is a change in level in signal S3 at the start of period Hr, it means either that the signal C contains a transition at the center of the corresponding bit-time, following a bit-time in which no such transition was present, or that signal C has no central transition in the corresponding bit-time, after a bit-time in which there was such a transition. Reference to the coding principles will show that in either case, the corresponding input bit was a "1".

Similarly, if there is no level change in signal S3 at the start of a period of Hr, this means either that signal C has a transition at the center of the corresponding bit time, following a bit time with the same type of transition, or that signal C has no transition at the center of the bit-time, following a bit-time not having such a transition either. As can be seen, the input bit was in either case a 0.

Thus, to restitute binary input B it is sufficient to detect the presence or absence of a level change in signal S3 at the start of each period of signal Hr: this is done with "delay" flip-flop 15 and gate 16, the latter delivering the restored NRZ signal. As Hr leads clock H by a quarter of a period, the restored input signal is delivered with a delay of ¾ of a period.

Figure 6:
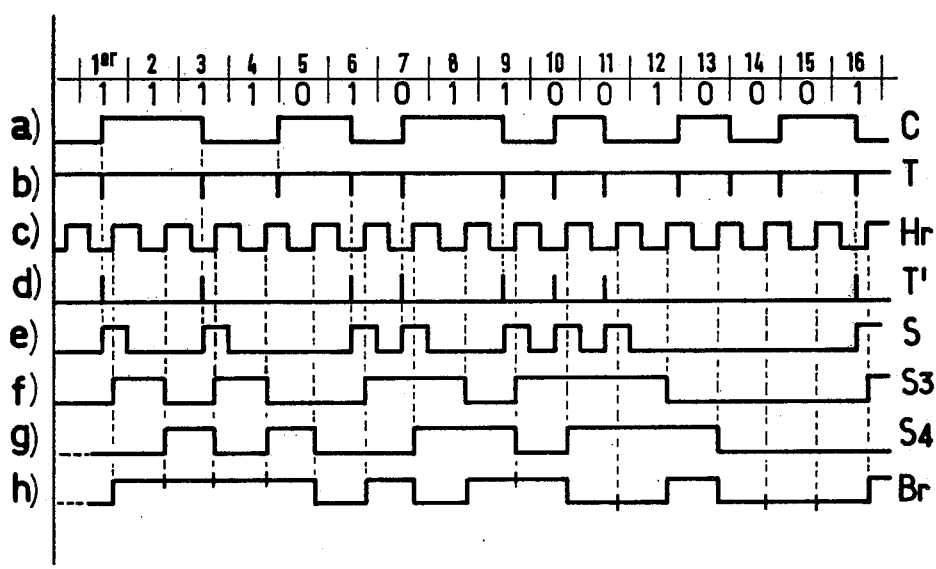
FIGS. 6 and 7, illustrate the operation of the decoding device represented in FIG. 5.

FIG. 6 is a phase diagram of the operation of the decoding device represented in FIG. 5. Line (a) represents an example of signal C to be decoded, and the corresponding bit times and binary input B are shown directly above waveform C. The example illustrated by FIG. 4 is used here again: line (b) represents transition pulses T delivered by detector 1, and line (c) represents clock signal Hr. Lines (d) and (e) respectively represent pulses T' and signal S. Signals S3 and S4 are represented by lines (f) and (g) respectively, and the decoded output Br is represented by line (h).

It is of course assumed that the signal to be decoded has been preceeded by a phase-locking preamble.

Signal C is shown over a duration of 16 bits, numbered 1 to 16: it changes in level at the centers of bit-times 1–3–6, 7–9, 10, 11–16, in total eight, and has either a level change at the start of the remaining bit-times, or remains constant.

Each of the 8 central changes or "transitions" results in a pulse T coinciding with the center of a low level of signal Hr, and which is therefore inverted in going through gate 4. As signal S has a pulse I during the second half of the 8 bits mentioned above, sampling of this signal by the 8 rising edges of signal Hr appearing at ¾ of their length, produces a "1" in signal S3 each time. On the contrary, sampling of S by the 8 rising edges of Hr at ¾ of the remaining bit-times, results in a "0" in S3, each time. S3 therefore changes in level at the starts of the 9 periods of signal Hr which begin at ¾ of the following bit-times: 1, 2, 3, 4–6–8, 9–12–16. Comparison by gate 16 of the levels of S3 and delayed signal S4 thus produces a "1" in signal Br corresponding with each of the 9 periods of signal Hr, and a "0" in Br, corresponding with the seven others.

Figure 7:
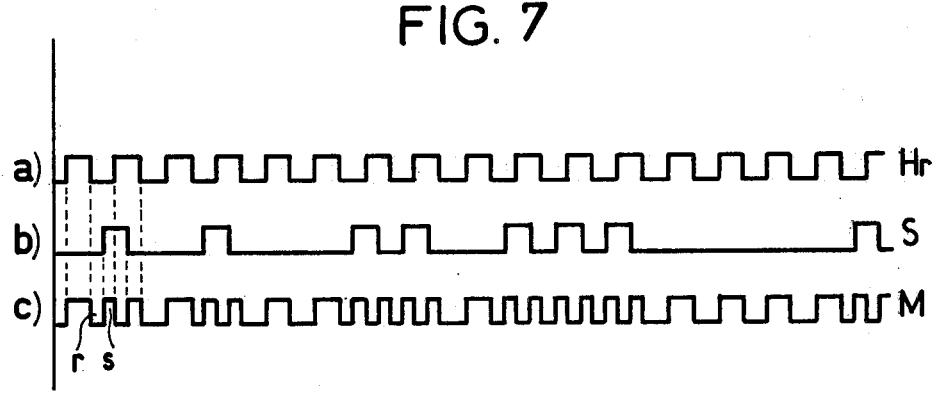

In FIG. 7, lines (a) and (b) show waveforms (c) and (e) respectively of FIG. 6, and line (c) represents signal M driving oscillator 81 through low-pass filter 13.

As can be seen in FIG. 7, when the operative levels of signal Hr (which in this particular case are low levels) are centered on the starts of pulses I in signal S, pulses such as r and s of signal M are of the same width, and signal M will have a d.c. component which will be constant, whatever the content of the message decoded. This voltage, applied to oscillator 81, maintains balance.

On the contrary, if signal Hr is a little too fast, the starts of pulses I are delayed. The down-going pulses of signal M such as r become wider, at the expense of the rising pulses s, which therefore become narrower: the voltage applied to the oscillator is reduced, re-establishing balance.

Similarly, it can be seen that if Hr is a little too slow, this will increase the driving voltage of 81, again re-establishing balance.

It will be noted that there are in theory two situations of balance for phase-locking loop 9: one when locked on the centrally-situated level changes of signal C, and the other when locked on level changes in this signal at the starts of bit-times. In the first case, signal Br will correctly reproduce binary input b, and in the second case, it will not.

In practice, however, errors in phase-locking in the case of a random signal such as B are rare, and binary data signals are usually of this type. Signal C thus has twice as many transitions at the centers of bit-times, than at their beginnings. If, however, any risk of wrong phase-locking is to be excluded, it will be sufficient to transmit a preamble before each message, composed of a string of 1's, and therefore producing central transitions exclusively, thereby forcing the loop to lock onto these level changes.

The coding process according to the invention provides particular advantages in the transmission of binary information.

It will be noted, in particular, that in the case of random binary data, which is the practical case, the energy of the signal coded according to the process is concentrated at about 0.4 times the timing frequency of the data: spectral distribution is therefore narrow, so that a narrower transmission band may be used then if coding in a NRZ or two-state code. Further, the energy of the coded signal being practically nil at the lower end of the spectrum, there is no d.c. component to transmit.

The foregoing has been a description of a particular form of invention, and it will be understood that changes and/or replacements by means of technically equivalent means are possible. In particular, the functions of the high and low levels of signal Hr can be reversed, in the decoding device, selecting transition pulses occuring during the high levels of this signal, and sampling signal S with its falling edges.

What we claim is:

1. A method of coding synchronous binary data timed by a frequency F, in which said data are coded by level transitions produced in an electrical signal exhibiting two levels under the control of a clock signal defining a bit-time of duration 1/F for each binary digit, wherein the method comprises producing a transition in said two-level signal in the middle of each bit-time occupied by a bit of a first given value, and inhibiting such transitions in the two-level signal if said signal has changed level in the middle of the preceeding bit-time; producing a transition in the two-level signal at the start of each bit-time occupied by a bit of a second given value, and shifting said transition to the middle of that bit-time, if the two-level signal has changed level in the middle of the previous bit, and maintaining the level of said two-level signal constant during the remainder of the time.

2. A coding device for synchronous binary data timed by a frequency F, which is controlled by clock signal H at frequency F defining a bit-time of duration 1/F for each bit and applying the coding procedure of claim 1, said device comprising a first means receiving the said binary data and the clock signal H to provide a first two-level signal having a level transition in the middle of each bit-time for which the data has the first said given value, second means receiving the said data and the clock signal H and providing a second two-level signal having a level transition at the beginning of each bit-time for which the data has the second said given value, third means receiving the said first signal to provide a third two-level signal which changes level at each transition of a first level to a second level of the said first signal, fourth means receiving the said second signal and controlled by the said first means to provide a fourth two-level signal which changes level at each transition of the second signal which occurs while the said first signal is at the said first level and also one half period $\frac{1}{2}$ F after each transition of the second signal which occurs when the first signal is at the said second level, and fifth means receiving the said third and the said fourth signals to provide a two-level signal having a level transition at each transition at each of the said third and fourth signals.

3. A coding device according to claim 2 wherein the said fifth means is formed by an EXCLUSIVE OR gate.

4. A coding device according to claim 2 wherein the said clock signal H has a form factor $\frac{1}{2}$, the said fourth means comprises means for phase modulating the clock signal H with the first signal, and a sampling and blocking flip-flop sampling the said second signal under the control of the modulated clock signal and delivering the said fourth signal.

5. A coding device according to claim 2 wherein the said third means comprises a D type flip-flop clocked by the said first signal and whose inverted ouput is fed back to its D input.

6. A coding device according to claim 2 wherein the said data is in the form of an NRZ signal, the said first means comprising a J-K type flip-flop receiving the said NRZ signal on its J and K inputs and clocked by the clock signal H to change in the middle of each bit period for which the data has the said first value, and the said second means comprises a JK flip-flop receiving the inverted NRZ signal on its J and K inputs and clocked by the clock signal to change state at the beginnings of the bit periods for which the data has the said second value.

7. A device for the decoding of signal resulting from encoding according to the process according to claim 1, of synchronous binary information timed at frequency F, and comprising a transition detector for detection of the transitions in the signal to be decoded, a local clock comprising a voltage driven oscillator, said clock delivering a signal Hr at frequency F and composed of alternating pulses of a first and second level, each of $\frac{1}{2}$.F duration; A first means connected to said detector and receiving said signal Hr to deliver a pulse I of $\frac{1}{2}$.F duration following each transition in the signal for decoding which has occured when signal Hr was at a given level of the two said levels; a second means for phase modulation of said signal Hr by means of signal S, the latter consisting of a string of pulses I, the modulated signal delivered by said second means being filtered by a low-pass filter before application in control of said oscillator, so that said given levels of signal Hr will be centered on transitions situated at the center of bit-times in the signal to be decoded; a sampling-rejecting circuit receiving signal S and controlled by the edges of the Hr signal going from said stated level to the other level; a third means clocked by Hr to detect the transitions in the output signal of said sampling-rejecting circuit and to deliver a bit of said first or said second value, at each period of signal Hr, according to whether the output of said sampling-rejecting circuit has or does not have a transition at the start of said period of signal Hr.

8. A coding device according to claim 7, possessing the feature that said transition detector delivers a brief output pulse, termed a "transition" pulse, in response to each transition in the input message, and that said first means comprises a gate for selection amongst all the transition pulses of those which occur while signal Hr is at said given level, plus a one shot multivibrator to extend the transition pulses so selected in duration to $\frac{1}{2}$.F.

9. A decoding device according to claim 7, wherein said second means comprises an exclusive OR gate.

10. A decoding device according to claim 7, wherein said third means comprises a device which delays the output signal of the sampling-rejecting circuit by one period of signal Hr, and a device for comparison of the levels of said delayed signal and the undelayed output of said sampling-rejecting circuit.

11. A binary data transmission equipment an encoding device in the transmitting terminal for transformation of said binary data into a coded signal, and a decoding device at the receiving terminal, to decode the coded signal received, said encoding device being in accordance with claims 2, and possessing the features that the decoding device comprises a transition detector for detection of the transitions in a signal to be decoded, a local clock including a voltage-driven oscillator, said clock delivering a signal Hr at frequency F and in the form of alternating bidirectional pulses defining a first and a second level, each of duration $\frac{1}{2}$.F, a first means connected to said detector and receiving said signal Hr, to deliver a pulse I of duration $\frac{1}{2}$.F following each transition in the signal to be decoded that occured when signal Hr was at a given level of its two levels, a second means for phase-modulation of said signal Hr by means of signal S, the latter consisting of the series of pulses, I the modulated signal delivered by said second means being filtered through a low-pass filter and applied in control of said oscillator, so that said given levels of signal Hr will be centered on transitions occuring at the center of bit-time in the signal to be decoded; a sampling-rejecting circuit receiving signal S and responding to the edges of signal Hr pulses going from said given level to the other level; a third means clocked by signal Hr and detecting the transitions in the sampling-rejecting circuits output signal so as to deliver, in coincidence with each period of signal Hr, a bit of said first or second value, according to whether the output signal of the sampling-rejecting circuit has or does not have a transition at the start of said period of signal Hr.

* * * * *